United States Patent [19]

Speer et al.

[11] Patent Number: 5,425,896
[45] Date of Patent: Jun. 20, 1995

[54] METHODS AND COMPOSITIONS FOR OXYGEN SCAVENGING

[75] Inventors: Drew V. Speer; William P. Roberts, both of Columbia; Charles R. Morgan, Brookeville, all of Md.

[73] Assignee: W. R. Grace & Co.-Conn., New York, N.Y.

[21] Appl. No.: 44,350

[22] Filed: Apr. 7, 1993

Related U.S. Application Data

[62] Division of Ser. No. 722,067, Jun. 27, 1991, Pat. No. 5,211,875.

[51] Int. Cl.$^6$ .................... C09K 15/02; C09K 15/04; B29D 22/00
[52] U.S. Cl. .................... 252/188.28; 522/66; 252/383; 428/35.2; 428/35.8; 428/35.9
[58] Field of Search .................. 252/188.28, 181.3; 522/21, 22, 29, 66; 428/35.2, 35.3, 35.4, 35.5, 35.8, 35.9

[56] References Cited

U.S. PATENT DOCUMENTS

| | | | |
|---|---|---|---|
| 3,857,804 | 12/1974 | Glatti et al. | 522/12 |
| 4,482,624 | 11/1984 | Arney et al. | 430/138 |
| 4,994,527 | 2/1991 | Abraham et al. | 525/326.2 |
| 4,994,528 | 2/1991 | Abraham et al. | 525/338 |
| 5,108,807 | 4/1992 | Tucker | 428/35.2 |
| 5,194,478 | 3/1993 | Frandsen et al. | 524/398 |
| 5,239,016 | 8/1993 | Cochran et al. | 525/371 |
| 5,246,753 | 9/1993 | Koyama et al. | 428/36.7 |

FOREIGN PATENT DOCUMENTS 0421512 of 1991 European Pat. Off. .

OTHER PUBLICATIONS

European Search Report dated Dec. 13, 1993.
Database WPI, Derwent Publications, London, AN 79-32145B & JP-A-54 034 337 Hitachi Chemical KK-13 Mar. 1979-Abstract Only.
Database WPI, Derwent Publications, London; AN 78-06986A & JP-A-52 145 798 Hitachi Chemical KK-5 Dec. 1977-Abstract Only.

*Primary Examiner*—Robert L. Stoll
*Assistant Examiner*—Joseph D. Anthony
*Attorney, Agent, or Firm*—Valerie E. Looper

[57] ABSTRACT

A method of initiating oxygen scavenging by compositions which comprise oxidizable organic compounds and transition metal catalysts is disclosed. The method comprises initiating scavenging by exposing the composition, etc., to radiation. The radiation exposure is preferably electron beam or ultraviolet light and is preferably used on oxygen scavenging compositions which comprise a substituted or unsubstituted ethylenically unsaturated hydrocarbon and a transition metal catalyst. Inclusion of a photoinitiator or antioxidant in the scavenging composition is also preferred to facilitate and/or control the composition's scavenging properties. The method can be used for initiating scavenging in packaging layers or articles for oxygen sensitive products such as food and beverage.

20 Claims, No Drawings

METHODS AND COMPOSITIONS FOR OXYGEN SCAVENGING

This is a division of application Ser. No. 722,067, filed Jun. 27, 1991 now U.S. Pat. No. 5,211,875.

FIELD OF THE INVENTION

The invention generally relates to compositions, articles and methods of scavenging oxygen in environments containing oxygen-sensitive products, particularly food and beverage products. As will be evident from the disclosure below, the term "oxygen scavenger" or "scavenger" refers to compositions which consume, deplete or reduce the amount of oxygen from a given environment.

BACKGROUND OF THE INVENTION

It is well known that limiting the exposure of oxygen-sensitive products to oxygen maintains and enhances the quality and "shelf-life" of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and having to restock. In the food packaging industry, several means for limiting oxygen exposure have already been developed. At present, the more commonly used means include modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, means for limiting oxygen exposure involves incorporating an oxygen scavenger into the packaging structure. Incorporation of a scavenger in the package can provide a uniform scavenging effect throughout the package. In addition, such incorporation can provide a means of intercepting and scavenging oxygen as it is passing through the walls of the package (herein referred to as an "active oxygen barrier"), thereby maintaining the lowest possible oxygen level throughout the package.

One example of an oxygen scavenger incorporated into an oxygen scavenging wall is illustrated in European Applications 301,719 and 380,319 as well as in PCT 90/00578 and 90/00504. See also U.S. Pat. No. 5,021,515. The oxygen scavenger disclosed in these patent applications comprises a transition metal catalyst and polyamide. Through catalyzed scavenging by the polyamide, the package wall regulates the amount of oxygen which reaches the interior of the package (active oxygen barrier). However, it has been found that the onset of useful oxygen scavenging by this wall, i.e. up to about 5 cubic centimeters (cc) oxygen per square meter per day at ambient conditions, may not occur for as long as 30 days. See Example 10 herein. The delay before the onset of useful oxygen scavenging is hereinafter referred to as the induction period.

In fact, other oxygen scavengers and walls which incorporate these scavengers may also exhibit an induction period. For instance oxygen scavengers comprising a transition metal catalyst and an ethylenically unsaturated compound, e.g. polybutadiene, polyisoprene, dehydrated castor oil, etc., may exhibit induction periods. These scavengers are disclosed in copending Ser. No. 679,419, filed on Apr. 2, 1991 for "Compositions, Articles and Methods for Scavenging Oxygen". When the oxygen scavenger comprises a polybutadiene, the induction period can exceed thirty days. Scavengers comprising polyisoprene or dehydrated castor oil typically have shorter induction periods, i.e. about fourteen- and one-day delays respectively. As is evident, the duration of induction periods depends on several factors, some of which are not completely understood or controlled. Accordingly, when using oxygen scavengers having longer induction periods, it will be required to keep the scavenger or oxygen scavenging layers and articles prepared therefrom in inventory prior to using them as scavengers in order to provide reliable scavenging behavior. On the other hand, when using scavengers having shorter induction periods, the layers and articles prepared therefrom will have to be prepared quickly and put to use in a short time period, sometimes immediately, in order to get the maximum effectiveness as a scavenger. Otherwise, they would have to be stored in an oxygen-free atmosphere which can be costly.

One method which could be employed to initiate scavenging on demand in packages for oxygen-sensitive foods involves incorporating photooxidizable rubber, i.e. cis-1,4-polyisoprene, and a photosensitizing dye into the inner surface of a package and then exposing it to visible light. See Rooney, M. L., "Oxygen Scavenging: A Novel Use of Rubber Photo-oxidation", *Chemistry and Industry*, Mar. 20, 1982, pp. 197–198. However, while this method initiates oxygen scavenging within minutes, and thus allows one to initiate oxygen scavenging when desired, it requires constant exposure of the package to light to maintain the scavenging effect. Even further, because a dye is involved, it would be difficult to employ this method for applications which require colorless packaging, especially the transparent and usually colorless packaging used with food and beverage products.

SUMMARY OF THE INVENTION

It is thus an object of the invention to develop methods and novel compositions which are effective in controlling the scavenging properties of an oxygen scavenger, thereby providing a means to initiate oxygen scavenging on demand.

It is also an object to employ these methods with compositions suitable for incorporation into layers used in articles containing oxygen-sensitive products.

It is also an object to provide methods for initiating oxygen scavenging in a multilayer article containing oxygen-sensitive products, particularly food and beverage products.

The above-mentioned objects are obtained from a method of scavenging oxygen by a composition comprising an oxidizable organic compound and a transition metal catalyst wherein the method comprises exposing the composition to radiation, e.g. actinic or an electron beam. This method can be used on oxygen scavengers in film layers and multilayered articles, especially those used for packaging oxygen-sensitive products. This method can be used during or after fabrication of the film or article comprising the oxygen scavenger. When the layer or article is being prepared for packaging oxygen sensitive products, the method could be employed before, during or after the packaging of the products.

A composition comprising (a) a substituted or unsubstituted ethylenically unsaturated hydrocarbon, and (b) a transition metal catalyst is particularly preferred when using this method.

It is also preferable that this composition comprises a photoinitiator and/or antioxidant to further facilitate and/or control the initiation of scavenging.

When the composition comprising (a) and (b) above is used with or in a layer such as a film layer, novel articles for packaging oxygen-sensitive products can also be prepared. When using those articles with the method described herein, the article regulates the oxygen exposure by acting as an active oxygen barrier and/or acting as means for scavenging oxygen from within the article.

The above-mentioned goals and others will be apparent from the description that follows.

DESCRIPTION OF THE INVENTION

The method of this invention can be used with packaging articles used in a variety of fields. Packaging articles typically come in several forms including rigid containers, flexible bags, combinations of both, etc. Typical rigid or semirigid articles include plastic, paper or cardboard cartons or bottles such as juice containers, soft drink containers, thermoformed trays or cups which have wall thicknesses in the range of 100 to 1000 micrometers. Typical flexible bags include those used to package many food items, and will likely have thicknesses of 5 to 250 micrometers. The walls of such articles either comprise single or multiple layers of material.

The method of this invention can also be used on packaging which has non-integral oxygen-scavenging components or layers, e.g., coatings, bottle cap liners, adhesive or non-adhesive sheet inserts, gaskets, sealants or fibrous mat inserts.

The products which are packaged in such packaging articles include not only food and beverage, but also pharmaceuticals, medical products, corrodible metals or products such as electronic devices, etc.

In order to employ the method of this invention, the oxygen scavengers or the layer or packaging article prepared therefrom should comprise oxidizable organic compounds. Such compounds include, but are not necessarily limited to, benzylic, allylic and/or tertiary hydrogen containing carbon compounds.

Specific compounds include polymers and copolymers of alpha olefins. Examples of such polymers are low density polyethylene, very low density polyethylene, and ultra low density polyethylene; polypropylene; polybutylene, i.e., poly(1-butene); propylene copolymers; butylene copolymers; hydrogenated diene polymers; etc.

Suitable oxidizable compounds also include polyamides such as aromatic polyamides, e.g. metaxylylene adipamide. Other suitable polyamides are disclosed in European Patent Application 301,719.

As mentioned above, it is particularly preferred to use a substituted or unsubstituted ethylenically unsaturated hydrocarbon with this invention. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, polybutadiene (especially 1,2-polybutadienes, which are defined as those polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as $\beta$-carotene.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates.

The composition used may also comprise a mixture of two or more of the substituted or unsubstituted ethylenically unsaturated hydrocarbons described above.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is acceptable.

Transparent oxygen-scavenging layers and packaging articles prepared from 1,2-polybutadiene are especially preferred. For instance, those films exhibit transparency, mechanical properties and processing characteristics similar to those of polyethylene. In addition, these films retain their transparency and mechanical integrity even after most or all of its oxygen capacity has been consumed, and even when little or no diluent resin is present. Even further, such films exhibit a relatively high oxygen capacity and, once scavenging has been initiated, they exhibit a relatively high scavenging rate as well.

As indicated earlier, the method of this invention is used with scavenging compositions, layers or articles which comprise transition metal catalysts. While not being bound by any particular theory, preferable catalysts are those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a salt, with the metal thereof selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, 2-ethylhexanoate, neodecanoate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

As will be evident, the method of this invention can initiate oxygen scavenging in a composition, layer or packaging article solely prepared from the oxidizable organic compound and transition metal catalyst without photoinitiator. However, components such as photoinitiators or antioxidants can be added to further facilitate or control the initiation of oxygen scavenging properties. Moreover, additional components such as diluents can be added to render the layers more adaptable for use as packaging layers.

For instance, it is often preferable to add a photoinitiator, or a blend of different photoinitiators, to the compositions used to prepare the oxygen scavenger, if antioxidants are included to prevent premature oxidation of that composition.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene -7,12-dione, 2,2-dimethoxy-2-phenylacetophenone, α,α- diethoxyacetophenone, α,α-dibutoxyacetophenone, etc. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl] propanone]. Use of a photoinitiator is preferable because it generally provides faster and more efficient initiation. When actinic radiation is used, the initiators may also provide initiation at longer wavelengths which are less costly to generate and less harmful.

As mentioned above, antioxidants may be used with this invention to control scavenging initiation. An antioxidant as defined herein is any material which inhibits oxidative degradation or cross-linking of polymers. Typically, such antioxidants are added to facilitate the processing of polymeric materials and/or prolong their useful lifetime. In relation to this invention, such additives prolong the induction period for oxygen scavenging in the absence of irradiation. Then when the layer's or article's scavenging properties are required, the layer or article (and any incorporated photoinitiator) can be exposed to radiation.

Antioxidants such as 2,6-di(t-butyl)-4-methylphenol(BHT), 2,2'-methylene-bis(6-t-butyl-p-cresol), triphenylphosphite, tris-(nonylphenyl)phosphite and dilaurylthiodipropionate would be suitable for use with this invention.

The method of this invention can also be used on oxygen scavenging layers which comprise film-forming diluent polymers. Such polymers are thermoplastic and render the film more adaptable for use as packaging layers. They also may be, to some extent, oxidizable, and thus factored in the oxygen scavenger formulation as an oxidizable organic compound. Suitable diluents include, but are not limited to, polyethylene, low density polyethylene, very low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene-(meth)acrylic acid and ethylene-(meth)acrylic acid ionomers. In rigid articles such as beverage containers PET is often used. Blends of different diluents may also be used. However, the selection of the polymeric diluent largely depends on the article to be manufactured and the end use thereof. Such selection factors are well known in the art. For instance, the clarity, cleanliness, effectiveness as an oxygen scavenger, barrier properties, mechanical properties and/or texture of the article can be adversely affected by a blend containing a diluent polymer which is incompatible with the oxidizable organic compound.

Other additives which may also be included in oxygen scavenger layers include, but are not necessarily limited to, fillers, pigments, dyestuffs, stabilizers, processing aids, plasticizers, fire retardants, anti-fog agents, etc.

To prepare oxygen scavenging layers and articles, the desired components thereof are preferably melt-blended at a temperature in the range of 50° C. to 300° C. However alternatives such as the use of a solvent followed by evaporation may also be employed. The blending may immediately precede the formation of the finished article or preform or precede the formation of a feedstock or masterbatch for later use in the production of finished packaging articles. When the blended composition is used to make film layers or articles, (co)extrusion, solvent casting, injection molding, stretch blow molding, orientation, thermoforming, extrusion coating, coating and curing, lamination or combinations thereof would typically follow the blending.

The amounts of the components which are used in the oxygen scavenging compositions, layers and/or articles have an effect on the use, effectiveness and results of this method. Thus, the amounts of oxidizable organic compound, transition metal catalyst and any photoinitiator, antioxidant, polymeric diluents and additives, can vary depending on the article and its end use.

For instance, the primary function of an oxidizable organic compound in the oxygen scavenger is to react irreversibly with oxygen during the scavenging process, while the primary function of the transition metal catalyst is to facilitate this process. Thus, to a large extent, the amount of oxidizable organic compound will affect the oxygen capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the induction period.

The amount of oxidizable organic compound may range from 1 to 99%, preferably from 10 to 99%, by weight of the composition or layer in which both oxidizable organic compound and transition metal catalyst are present (hereinafter referred to as the "scavenging component" e.g., in a coextruded film, the scavenging component would comprise the particular layer(s) in which both oxidizable compound and transition metal catalyst are present together).

Typically, the amount of transition metal catalyst may range from 0.001 to 1% (10 to 10,000 ppm) of the scavenging component, based on the metal content only (excluding ligands, counterions, etc.). In the event the amount of transition metal catalyst is less than 1%, it follows that the oxidizable organic compound, and any diluent or additives, will comprise substantially all of the scavenging component, i.e. more than 99% as indicated above for the oxidizable organic compound.

When a photoinitiator is used, its primary function is to enhance and facilitate the initiation of oxygen scavenging upon exposure to radiation. The amount of photoinitiator can vary. In many instances, the amount will depend on the oxidizable compounds used, the wavelength and intensity of radiation used, the nature and amount of antioxidants used, as well as the type of photoinitiator used. The amount of photoinitiator also depends on how the scavenging component is used. For instance, if the photoinitiator-containing component is placed underneath a layer which is somewhat opaque to the radiation used, more initiator may be needed.

For most purposes, however, the amount of photoinitiator, when used, will be in the range of 0.01 to 10% by weight of the total composition.

The amount of any antioxidant which may be present in the composition will also affect the results of the method. As mentioned earlier, such materials are usually present in oxidizable organic compounds or diluent polymers to prevent oxidation and/or gelation of the polymers. Typically, they are present in about 0.01 to 1% by weight. However, additional amounts of antioxidant may also be added if it is desired to tailor the induction period as described above.

When one or more diluent polymers are used, those polymers can comprise, in total, as much as 99% by weight of the scavenging component.

Any further additives employed normally will not comprise more than 10% of the scavenging component, with preferable amounts being less than 5% by weight of the scavenging component.

As indicated earlier, the invention can be used with a single scavenging layer or a scavenging layer present in a multilayer article. Single layered articles can be prepared by solvent casting or by extrusion. Multilayered articles are typically prepared using coextrusion, coating and/or lamination.

The additional layers of a multilayered article may include "oxygen barrier" layers, i.e. those layers of material having an oxygen transmission rate equal to or less than 500 cubic centimeters per square meter ($cc/m^2$) per day per atmosphere at room temperature, i.e. about 25° C. Typical oxygen barriers comprise poly(ethylene vinylalcohol), polyacrylonitrile, polyvinyl chloride, poly(vinylidene dichloride), polyethylene terephthalate, silica, and polyamides. Copolymers of certain materials described above, and metal foil layers, can also be employed.

Other additional layers may include one or more layers which are permeable to oxygen. In one preferred packaging construction, especially for flexible packaging for food, the layers include, in order starting from the outside of the package to the innermost layer of the package, (i) an oxygen barrier layer, (ii) a scavenging layer, i.e. the scavenging component as defined earlier, and optionally, (iii) an oxygen permeable layer. Control of the oxygen barrier property of (i) allows a means to regulate the scavenging life of the package by limiting the rate of oxygen entry to the scavenging component (ii), and thus limiting the rate of consumption of scavenging capacity. Control of the oxygen permeability of layer (iii) allows a means to set an upper limit on the rate of oxygen scavenging for the overall structure independent of the composition of the scavenging component (ii). This can serve the purpose of extending the handling lifetime of the films in the presence of air prior to sealing of the package. Furthermore, layer (iii) can provide a barrier to migration of the individual components in the scavenging films or by-products of scavenging into the package interior. Even further, layer (iii) also improves the heat-sealability, clarity and/or resistance to blocking of the multilayer film.

Further additional layers such as adhesive layers may also be used. Compositions typically used for adhesive layers include anhydride functional polyolefins and other well-known adhesive layers.

Once the components have been chosen and formulated for the desired scavenging composition, layer or article, the method of this invention employs exposing the composition, layer or article to radiation in order to initiate oxygen scavenging. To initiate oxygen scavenging in an oxygen scavenger is defined herein as facilitating scavenging such that the induction period of oxygen scavenging is significantly reduced or eliminated. As indicated above, the induction period is the period of time before the scavenging composition exhibits useful scavenging properties. Further, initiation of oxygen scavenging may also apply to compositions which have an indeterminate induction period in the absence of radiation. See Example 6.

While the exact manner in which oxygen scavenging is initiated is not known, it is believed, without being held to any specific theory, that one or more of the following occurs when the oxygen scavenger is exposed to radiation:

(a) substantial depletion of any antioxidant(s), if present, thus allowing oxidation to proceed;

(b) activation of the transition metal catalyst through a change in the metal's oxidation state and/or its configuration of ligands, thus increasing its effect on scavenging; or (c) a substantial increase in free radical and/or peroxide species present in the system, despite the inhibiting effect of any antioxidant(s) if present or remaining.

The radiation used in this method can be actinic, e.g. ultraviolet or visible light having a wavelength of about 200 to 750 nanometers (nm), and preferably having a wavelength of about 200 to 400 nm. When employing this method, it is preferable to expose the oxygen scavenger to at least 0.1 Joules per gram of scavenging component. A typical amount of exposure is in the range of 10 to 100 Joules per gram. The radiation can also be an electron beam at a dosage of about 0.2 to 20 megarads, preferably about 1 to 10 megarads. Other sources of radiation include ionizing radiation such as gamma, x-rays and corona discharge. The radiation exposure is preferably conducted in the presence of oxygen. The duration of exposure depends on several factors including, but not limited to, the amount and type of photoinitiator present, thickness of the layers to be exposed, amount of any antioxidant present, and the wavelength and intensity of the radiation source.

When using oxygen scavenging layers or articles, the exposure to radiation can be during or after the layer or article is prepared. If the resulting layer or article is to be used to package an oxygen sensitive product, exposure can be just prior to or during or after packaging. However, in any event, radiation exposure is required prior to using the layer or article as an oxygen scavenger. For best uniformity of radiation, the exposure should be conducted at a processing stage where the layer or article is in the form of a flat sheet.

In order to use the method of this invention in the most efficient manner, it is preferable to determine the oxygen scavenging capabilities, e.g. rate and capacity, of the oxygen scavenger. To determine the rate of oxygen scavenging, the time elapsed before the scavenger depletes a certain amount of oxygen from a sealed container is measured. In some instances the scavenger's rate can be adequately determined by placing a film comprising the desired scavenger in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining. Usually, the specific rates obtained will vary under different temperature and atmospheric conditions. The rates indicated below are at room temperature and one atmosphere because they best represent the conditions under which, in many instances, the oxygen scavenger and/or layers and articles prepared therefrom will be used.

When an active oxygen barrier is needed, a useful scavenging rate can be as low as 0.05 cc oxygen ($O_2$) per gram of oxidizable organic compound in the scavenging component per day in air at 25° C. and at 1 atmosphere pressure. However, certain compositions, e.g. those containing the ethylenically unsaturated oxidizable organic compounds, have the capability of rates equal to or greater than 0.5 cc oxygen per gram per day, thus making such compositions suitable for scavenging oxygen from within a package, as well as suitable for active oxygen barrier applications. The scavengers comprising ethylenically unsaturated hydrocarbons are capable of more preferable rates equal to or greater than 5.0 cc $O_2$ per gram per day.

Generally, film layers suitable for use as an active oxygen barrier can have a scavenging rate as low as 1 cc oxygen per square meter per day when measured in air at 25° C. and 1 atmosphere pressure. However, the ethylenically unsaturated hydrocarbon-containing layers are capable of a scavenging rate greater than 10 cc oxygen per square meter per day, and can have an oxygen scavenging rate equal to or greater than about 25 cc oxygen per square meter per day under the same conditions. Such rates make those layers suitable for scavenging oxygen from within a package, as well as suitable for active oxygen barrier applications.

When it is desired to use this method with an active oxygen barrier application, the initiated oxygen scavenging activity, in combination with any oxygen barriers, should create an overall oxygen transmission rate of less than about 1.0 cubic centimeters per square meter per day per atmosphere at 25° C. The oxygen scavenging capacity should be such that this transmission rate is not exceeded for at least two days.

For many commercial applications, it is expected that the scavenging rates be able to establish an internal oxygen level of less than 0.1% in as soon as possible, preferably less than about four weeks' time. See Mitsubishi Gas and Chemical Company, Inc.'s literature titled "AGELESS ®"—A New Age in Food Preservation" (date unknown).

Once scavenging has been initiated, the scavenger, layer or article prepared therefrom, should be able to scavenge up to its capacity, i.e. the amount of oxygen which the scavenger is capable of consuming before it becomes ineffective. In actual use, the capacity required for a given application depends on:

(1) the quantity of oxygen initially present in the package,
(2) the rate of oxygen entry into the package in the absence of the scavenging property, and
(3) the intended shelf life for the package.

When using scavengers comprising ethylenically unsaturated compounds, the capacity can be as low as 1 cc oxygen per gram, but can be at least 50 cc oxygen per gram. When such scavengers are in a layer, the layer will preferably have an oxygen capacity of at least 250 cc oxygen per square meter per mil thickness and more preferably at least 1200 cc oxygen per square meter per mil thickness.

In order to further illustrate the practice of the present invention and the advantages thereof, the following examples are provided. However, these examples are in no way meant to be limitive, but merely illustrative. The percentages indicated in the Examples are percentages by weight of the formulation. All samples below, including the unirradiated controls, were exposed to ambient light during testing. It is believed that this may explain some variation in their scavenging properties.

EXAMPLE 1

MASTERBATCH PREPARATION

A masterbatch comprising transition metal catalyst was prepared by a continuous compounding and pelletizing operation. In particular, a dry blend of poly(ethylene vinylacetate), having a 9% vinylacetate content (EVA-9), and pellets of TEN-CEM ® cobalt neodecanoate catalyst (22.5% cobalt by weight) from Mooney Chemicals, was placed in the hopper of a BRABENDER ® counter-rotating, intermeshing, twin screw extruder, equipped with a strand die. The amount of catalyst used was 2.3% by weight, to give 5000 ppm cobalt in the masterbatch. The extruder was maintained at 120° C., with the die at 110° C. The resulting strand was fed through a water bath to cool and then dried with an air knife. The strand was then fed into a KILLION ® pelletizer. The resulting pellets, herein referred to as the "cobalt masterbatch", were then used in the formulations illustrated below.

A second masterbatch containing 10% benzophenone photoinitiator (Aldrich) and 5000 ppm TEN-CEM ® cobalt was prepared by the same method. The second masterbatch is herein referred to as "cobalt benzophenone masterbatch".

EXAMPLE 2

FILM PREPARATION AND TESTING

A multilayer, blown film was prepared by coextrusion from the cobalt masterbatch illustrated in Example 1. The resulting film was a two layer structure having a thickness of about 3 mils. One layer comprised poly(ethylene vinylacetate), and the other (scavenging) layer comprised 80% RB830 1,2polybutadiene from Japan Synthetic Rubber, 10% cobalt masterbatch, and 10% poly(ethylene carbon monoxide) (10% CO) from Dow Chemical included as a photoinitiator. The scavenging layer was about 1.5–2.0 mils thick. Samples of this film weighing about 5 g each were irradiated and then sealed in barrier bags containing a volume of 400 cc of air. Gas samples (4 cc) were then withdrawn from the bags through an adhesive rubber strip with a gastight syringe and were analyzed on a MOCON® model LC 700F oxygen analyzer. The following chart shows the scavenging activity of the films and the type and duration or amount of radiation with which they were exposed. The dashes (—) in the chart directly below, as well as those charts following the other examples, show that a sample was not taken. Specifically, the results below demonstrate that UV irradiated and electron-beam irradiated samples of this particular film are more effective than the control. The most efficient initiation was with the high dose electron beam.

| Time (days) | Unirrad. Control % $O_2$ | Irrad. UV$^a$ % $O_2$ | Irrad. E-beam$^b$ % $O_2$ | Irrad. E-beam$^c$ % $O_2$ |
|---|---|---|---|---|
| 0 | 20.6 | 20.6 | 20.6 | 20.6 |
| 2 | 20.6 | 20.5 | 20.6 | 18.6 |
| 4 | — | — | — | 13.1 |
| 6 | 20.6 | 20.1 | 20.6 | — |
| 8 | 20.6 | 19.3 | 20.6 | 0.000 |
| 14 | 20.6 | 16.6 | 20.6 | — |
| 20 | 20.6 | 11.8 | 6.7 | — |
| 23 | — | 7.3 | 0.000 | — |
| 26 | 20.6 | 4.3 | — | — |
| 28 | — | 2.16 | — | 0.000 |
| 33 | 20.6 | 0.000 | 0.000 | — |
| 46 | — | — | 0.000 | — |
| 61 | 20.6 | 0.000 | — | 0.000 |
| 77 | 20.6 | 0.000 | 0.000 | 0.000 |
| 100 | 20.6 | — | — | — |
| 113 | 16.1 | — | — | — |
| 126 | 1.50 | — | — | — |
| 142 | 0.000 | — | — | — |

$^a$Blacklight (UVA) for 5 minutes at 1.6 mW/cm$^2$
$^b$Electron beam dose of 1.1 Megarads
$^c$Electron beam dose of 7.6 Megarads

EXAMPLE 3

A second film was prepared and tested as in Example 2 except that the scavenging layer was 90% RB830 1,2-polybutadiene and 10% cobalt benzophenone masterbatch from Example 1. The chart directly below shows those test results and the type and duration or amount of irradiation used. The results below demonstrate that benzophenone initiator in this particular type of film is more effective than poly(ethylene carbon monoxide). Compare with Example 2. The results also demonstrate that UVA is more effective than electron beam irradiation with this particular type of film.

| Time (days) | Unirrad. Control % $O_2$ | Irrad. UV$^a$ % $O_2$ | Irrad. E-beam$^b$ % $O_2$ | Irrad. E-beam$^c$ % $O_2$ |
|---|---|---|---|---|
| 0 | 20.6 | 20.6 | 20.6 | 20.6 |
| 1 | 20.6 | 0.364 | — | 19.5 |
| 2 | 20.6 | 0.000 | — | 14.0 |
| 4 | — | — | 20.6 | 2.3 |
| 5 | 20.5 | 0.000 | 18.2 | — |
| 7 | 20.5 | 0.000 | 9.4 | 0.000 |
| 11 | — | — | 0.000 | — |
| 14 | 20.5 | 0.000 | 0.000 | 0.000 |
| 33 | 17.4 | — | — | 0.000 |
| 41 | 7.8 | — | — | — |
| 50 | 0.000 | — | — | — |
| 61 | 0.000 | 0.000 | — | — |

$^a$Blacklight (UVA) for 5 minutes at 1.6 mW/cm$^2$
$^b$Electron beam dose of 1.1 Megarads
$^c$Electron beam dose of 7.6 Megarads

EXAMPLE 4

This film sample was also prepared and tested as in Example 2, except that the scavenging layer consisted of RB830 1,2-polybutadiene, and 10% cobalt masterbatch from Example 1. The chart below shows those test results and the type and duration or amount of irradiation used. The results below demonstrate that with this particular type of film electron beam irradiation alone, i.e. without a photoinitiator, is sufficient to initiate oxygen scavenging.

| Time (days) | Unirrad. Control % $O_2$ | Irrad. UV$^a$ % $O_2$ | Irrad. E-beam$^b$ % $O_2$ | Irrad. E-beam$^c$ % $O_2$ |
|---|---|---|---|---|
| 0 | 20.6 | 20.6 | 20.6 | 20.6 |
| 1 | 20.6 | 20.6 | 20.6 | 20.3 |
| 2 | — | — | 20.6 | 19.7 |
| 3 | 20.6 | 20.6 | — | 19.0 |
| 8 | — | — | 20.6 | 14.7 |
| 10 | 20.6 | 20.6 | — | — |
| 14 | — | — | 16.2 | 3.6 |
| 16 | — | — | — | 0.86 |
| 18 | — | — | — | 0.000 |
| 19 | — | — | 0.000 | — |
| 27 | 20.6 | 20.6 | — | — |
| 41 | 20.6 | 20.6 | — | — |
| 62 | — | — | 0.000 | 0.000 |
| 73 | 20.6 | 20.6 | — | — |
| 88 | 20.6 | 18.9 | — | — |
| 96 | 20.6 | 12.2 | — | — |
| 110 | 20.5 | 0.000 | — | — |

$^a$Blacklight (UVA) for 5 minutes at 1.6 mW/cm$^2$
$^b$Electron beam dose of 1.1 Megarads
$^c$Electron beam dose of 7.6 Megarads

EXAMPLE 5

This film was also prepared and tested as in Example 2, except that the scavenging layer comprised 80% RB830 1,2-polybutadiene, 10% poly(ethylene carbon monoxide) (10% CO), and 10% cobalt benzophenone masterbatch from Example 1. The chart below shows those test results and the type and duration or amount of radiation used. The results demonstrate that a blend of photoinitiators can be used with this particular type of film.

| Time (days) | Unirrad. Control % $O_2$ | Irrad. UV$^a$ % $O_2$ | Irrad. E-beam$^b$ % $O_2$ | Irrad. E-beam$^c$ % $O_2$ |
|---|---|---|---|---|
| 0 | 20.6 | 20.6 | 20.6 | 20.6 |
| 1 | 20.6 | 0.91 | — | 20.2 |

-continued

| Time (days) | Unirrad. Control % O$_2$ | Irrad. UV$^a$ % O$_2$ | Irrad. E-beam$^b$ % O$_2$ | Irrad. E-beam$^c$ % O$_2$ |
|---|---|---|---|---|
| 2 | 20.6 | 0.000 | — | 18.2 |
| 3 | — | — | 16.7 | 14.6 |
| 4 | — | — | 14.3 | 9.3 |
| 7 | 20.6 | 0.000 | 4.3 | 0.000 |
| 14 | 20.6 | 0.000 | 0.000 | 0.000 |
| 20 | 19.6 | 0.000 | 0.000 | — |
| 26 | 9.4 | 0.000 | — | — |
| 28 | 4.9 | — | — | 0.000 |
| 33 | 0.000 | 0.000 | — | 0.000 |
| 61 | 0.000 | 0.000 | — | 0.000 |

$^a$Blacklight (UVA) for 5 minutes at 1.6 mW/cm$^2$
$^b$Electron beam dose of 1.1 Megarads
$^c$Electron beam dose of 7.6 Megarads

EXAMPLE 6

A formulation comprising 90% ethylene-propylene copolymer (5% ethylene) and 10% by weight cobalt benzophenone masterbatch was prepared in a BRABENDER ® mixing chamber. Two films weighing about 3 g each were then pressed in a CARVER ® lab press and tested as described in Example 2. The chart below shows the test results. The results demonstrate that oxygen scavenging can be initiated in films containing polymers having tertiary hydrogens.

| Time (days) | Unirrad. Control % O$_2$ | Irrad. UV$^a$ % O$_2$ |
|---|---|---|
| 0 | 20.6 | 20.6 |
| 3 | 20.6 | 19.1 |
| 16 | 20.6 | 15.7 |
| 28 | 20.6 | 12.8 |
| 50 | 20.6 | 8.4 |
| 64 | 20.6 | 5.9 |
| 80 | 20.5 | 3.5 |
| 91 | 20.4 | 1.68 |
| 102 | 20.2 | 0.35 |
| 114 | — | 0.003 |
| 119 | 19.5 | 0.000 |

$^a$Blacklight (UVA) for 10 minutes at 1.6 mW/cm$^2$

EXAMPLE 7

A formulation comprising 90% poly(1-butene) (melt index=20) from Aldrich and 10% of the cobalt benzophenone masterbatch was prepared in a BRABENDER ® mixing chamber. Two films weighing in the range of 2-3 grams were pressed and tested as described in Example 6. The chart below shows the test results. The results are similar to those shown in Example 6.

| Time (days) | Unirrad. Control % O$_2$ | Irrad. UV$^a$ % O$_2$ |
|---|---|---|
| 0 | 20.6 | 20.6 |
| 7 | 20.6 | 19.0 |
| 16 | 20.6 | 17.5 |
| 27 | 20.6 | 15.9 |
| 55 | 20.6 | 11.2 |
| 66 | 20.4 | 8.8 |
| 85 | 19.8 | 6.0 |
| 99 | 16.2 | 4.8 |

$^a$Blacklight (UVA) 10 minutes at 1.6 mW/cm$^2$

EXAMPLE 8

This example demonstrates that oxygen scavenging can be initiated in a shorter period of time by exposure to shorter UV wavelength irradiations (UVB and UVC), both with (Examples 2 and 3) and without (Example 4) use of photoinitiator. The results also demonstrate the effectiveness of radiation in a continuous process.

Four of the films described in Examples 2–4 were irradiated with a COLIGHT ® ultraviolet unit which uses a medium pressure mercury arc lamp. The samples were irradiated by one of two methods. In method A, a piece of film was attached to a reflective, rigid backing and passed under the lamp at 10 meters (m)/minute. In method B, a roll of film was passed under the light (reel-to-reel) at a speed of 10 m/minute. At the above speed the unit delivers about mJ/cm$^2$. Each film sample for testing weighed about g and was tested in a barrier bag containing 500 cc of air. The UV output was measured with an EIT integrating UV radiometer model 365CH1. The chart below shows those test results.

| Example: Time (days) | 2$^a$ % O$_2$ | 2$^b$ % O$_2$ | 3$^a$ % O$_2$ | 4$^b$ % O$_2$ |
|---|---|---|---|---|
| 0 | 20.6 | 20.6 | 20.6 | 20.6 |
| 2 | — | 18.5 | — | 20.6 |
| 3 | 8.1 | — | 0.000 | — |
| 4 | 2.09 | — | 0.000 | — |
| 5 | 0.000 | — | — | — |
| 6 | — | 0.80 | — | 17.1 |
| 7 | — | 0.000 | — | 10.4 |
| 14 | — | — | — | 0.000 |

$^a$Irradiated by method A
$^b$Irradiated by method B

EXAMPLE 9

The following formulation was prepared in a BRABENDER ® mixing chamber: 45.0 g of RB830 1,2-polybutadiene, 0.45 g of IRGACURE ® 651 photoinitiator from Ciba-Geigy and sufficient NOURY-DRY ® cobalt 2-ethylhexanoate stock solution from Akzo Inc. to make ppm cobalt by weight. Two 2–3 g films of this formulation were then pressed and tested as in Example 2. The chart below shows those results. The results show the effectiveness of 2,2-dimethoxy-2-phenylacetophenone, i.e. IRGACURE 651 photoinitiator.

| Time (days) | Unirrad. Control % O$_2$ | Irrad. UV$^a$ % O$_2$ |
|---|---|---|
| 0 | 20.6 | 20.6 |
| 1 | 20.6 | 16.0 |
| 5 | 20.5 | 6.9 |
| 8 | 19.9 | 3.01 |
| 11 | 11.7 | 0.035 |
| 14 | 4.5 | 0.000 |
| 22 | 0.233 | 0.000 |
| 25 | 0.008 | 0.000 |
| 29 | 0.000 | 0.000 |
| 48 | 0.000 | 0.000 |

$^a$Blacklight (UVA) for 10 minutes at 1.6 mW/cm$^2$

EXAMPLE 10

The following example demonstrates initiation of oxygen scavenging with MXD6 grade 6001 (meta-xylylene adipamide) resin from Mitsubishi Gas and Chemicals. Two formulations were prepared by solvent casting the MXD6 polyamide from hot acetic acid. Formula 1 comprised 3.3 g of MXD6 polyamide and sufficient NOURY-DRY® cobalt solution from Akzo Chemical to make ppm cobalt. Formula 2 comprised 3.1 g MXD6 polyamide, 0.038 g benzophenone (Aldrich), and sufficient NOURY-DRY® cobalt solution to make 500 ppm cobalt. Residual acetic acid was removed from the films in a vacuum oven. The film from Formula 1 was not irradiated while that from Formula 2 was irradiated for 10 minutes (UVA) at 1.6 mW/cm². Both films were tested in barrier bags with 400 cc of air.

| Time (days) | Formula 1 % Oxygen | Formula 2 % Oxygen |
|---|---|---|
| 0 | 20.6 | 20.6 |
| 1 | 20.6 | 19.3 |
| 7 | 20.6 | 14.8 |
| 14 | 20.6 | 12.1 |
| 23 | 20.5 | 10.5 |
| 34 | 19.8 | — |
| 39 | 17.4 | 9.0 |
| 48 | 14.8 | 8.7 |
| 63 | 11.7 | 8.1 |

EXAMPLE 11

A portion of the film described in Example 3 was exposed to UV radiation[a] in the same manner described in Example 3. The film was then tested as previously described in Example 2, except that the film was kept in the dark. The results below demonstrate that after initiation oxygen scavenging continues although exposure to radiation has ceased.

| Time (days) | % $O_2$ |
|---|---|
| 0 | 20.6 |
| 1 | 3.4 |
| 2 | 0.000 |
| 5 | 0.000 |

[a]Blacklight (UVA) for 5 minutes at 1.6 mW/cm²

The following controls demonstrate that the oxygen scavenging method according to this invention requires the presence of a transition metal catalyst.

CONTROL 1

A coextruded film was prepared as in Example 2, except that the polybutadiene layer consisted of 100% RB830 1,2-polybutadiene. This film was given an electron beam dose of 7.6 Mrad, and was then tested for scavenging as described above. The results are shown in the chart directly below.

| Time (days) | % $O_2$ |
|---|---|
| 0 | 20.6 |
| 1 | 20.6 |
| 7 | 20.6 |
| 17 | 20.5 |
| 44 | 20.6 |
| 62 | 20.6 |
| 78 | 20.6 |
| 85 | 20.6 |
| 126 | 19.9 |
| 135 | 19.4 |

CONTROL 2

A 6.7 g film was pressed from RB830 1,2-polybutadiene beads. This film was then irradiated by UVA for 10 minutes at 1.6 mW/cm² and tested for scavenging as described above, except that the barrier bag contained only 130 cc of air. The results are shown directly below.

| Time (days) | % $O_2$ |
|---|---|
| 0 | 20.6 |
| 20 | 20.6 |
| 43 | 20.6 |
| 62 | 20.6 |
| 116 | 20.6 |
| 132 | 20.6 |
| 148 | 20.6 |
| 162 | 20.6 |
| 190 | 20.6 |

What is claimed:

1. A process of preparing a layer or article suitable for scavenging oxygen wherein the layer or article comprises a film comprising an oxidizable organic compound and a transition metal catalyst, by exposing the film to actinic radiation having a wavelength of less than about 750 nm at an intensity of at least about 1.6 mW/cm² or an electron beam at a dose of at least about 0.2 megarads, wherein after initiation and in the presence of oxygen, the oxygen scavenging rate of the oxidizable organic compound is at least about 0.5 cc oxygen per day per gram of oxidizable organic compound for at least two days after oxygen scavenging is initiated.

2. A process according to claim 1 wherein said transition metal catalyst is a cobalt salt.

3. A process according to claim 1 wherein the oxidizable organic compound comprises polybutadiene.

4. A process according to claim 1 wherein the oxidizable organic compound comprises a hydrocarbon having tertiary hydrogens.

5. A process according to claim 1 wherein the oxidizable organic compound is a member of the group consisting of polypropylene, polybutylene, propylene copolymers and butylene copolymers.

6. A process according to claim 1 wherein said composition further comprises one or more photoinitiators.

7. A process according to claim 1 wherein said radiation is actinic radiation having a wavelength in the range of about 200 to about 750 nm.

8. A process according to claim 1 wherein said radiation is actinic radiation having a wavelength in the range of about 200 to 400 nm.

9. A process according to claim 1 wherein said radiation is an electron beam.

10. A process according to claim 1 wherein said layer is a member of the group consisting of liners, coatings, sealants, gaskets, adhesive or non-adhesive inserts and fibrous mat inserts.

11. A process according to claim 1 wherein said composition further comprises one or more antioxidants.

12. A process according to claim 11 wherein said composition further comprises one or more photoinitiators.

13. A process according to claim 1 wherein the oxidizable organic compound comprises a substituted or unsubstituted ethylenically unsaturated hydrocarbon.

14. A process according to claim 13 wherein the substituted ethylenically unsaturated hydrocarbon comprises an oxygen-containing moiety.

15. A process according to claim 14 wherein the oxygen-containing moiety is a member of the group consisting of esters, carboxylic acids, aldehydes, ethers, ketones, alcohols, peroxides and hydroperoxides.

16. A process according to claim 1 wherein said film is in the form of a package for an oxygen sensitive product.

17. A process according to claim 16 wherein said package is an oxygen barrier package.

18. A process according to claim 1 wherein said layer is in a multilayer film.

19. A process according to claim 18 wherein said multilayer film is in the form of a package for an oxygen sensitive product.

20. A process according to claim 19 wherein said package is an oxygen barrier package.

* * * * *